Aug. 29, 1933.   J. W. FRANZ   1,924,274
BAFFLE FOR FURNACES
Filed May 9, 1932

INVENTOR:
John William Franz.
BY Harry A. Beirne
ATTORNEY.

Patented Aug. 29, 1933

1,924,274

UNITED STATES PATENT OFFICE 1,924,274

BAFFLE FOR FURNACES

John W. Franz, St. Louis, Mo., assignor of one-half to Lawrence J. Rasse, Fairbury, Nebraska Application May 9, 1932. Serial No. 610,214

1 Claim. (Cl. 110—97)

My invention has relation to improvements in combination baffles and regenerators for furnaces, particularly furnaces for home heating, and it consists in the novel features of construction more fully set forth in the specification and pointed out in the claim.

Figure 1:
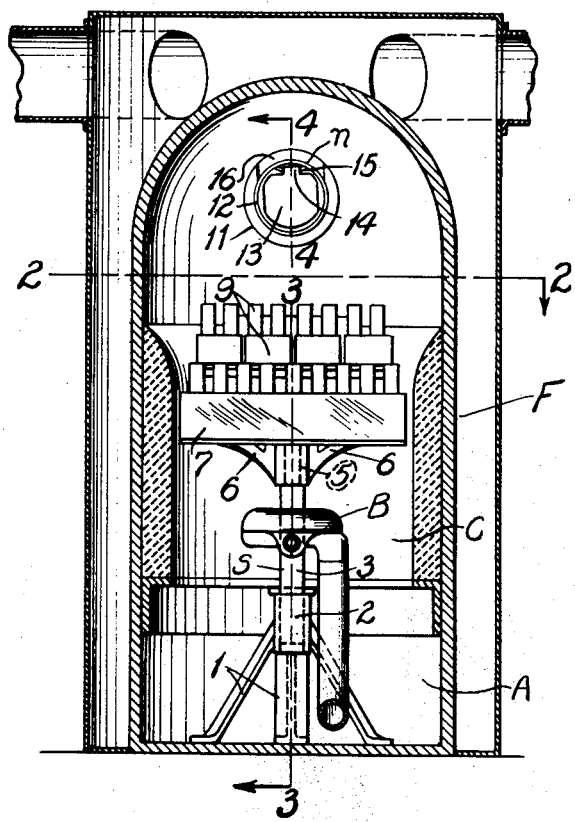
Figure 5:
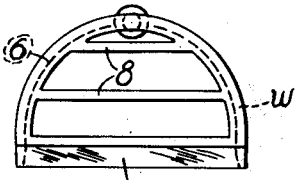
Figure 4:
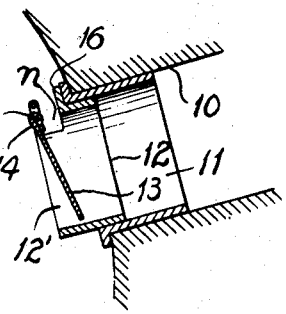
Figure 2:
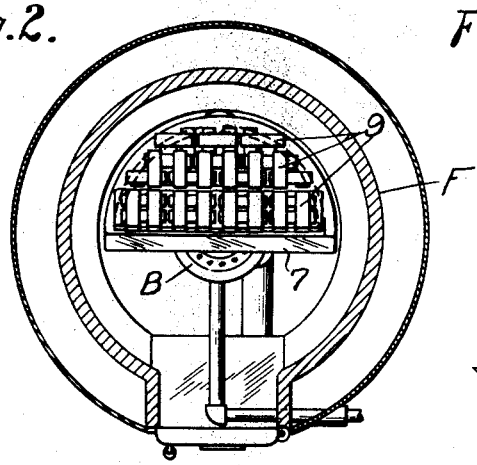
Figure 3:
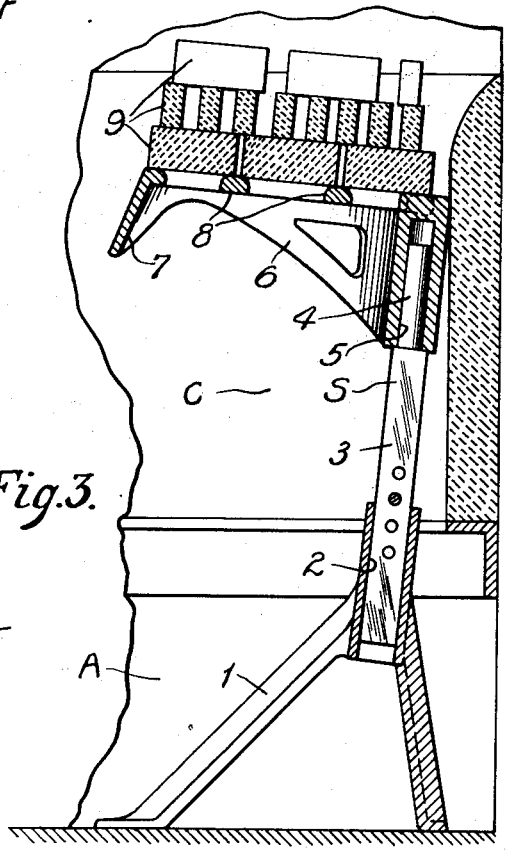

Many home heating furnaces are designed to burn solid fuel, such as coal or coke, hence their construction is such that ample time shall be provided for the combustion of the volatiles and that adequate draft may be admitted to the combustion chamber for the same purpose. When these furnaces are equipped with liquid fuel burners and no other alterations are made in the furnace their efficiency is extremely low and much of the heat produced is lost by escaping through the flue. I have overcome this lack of efficiency by providing a horizontal baffle within the combustion chamber on which a regenerator checker-work is disposed and at the same time have provided a damper for operation within the furnace dome whereby the draft may be adjusted to the proper degree to permit complete combustion of the fuel, and at the same time reduce to a minimum the escape of heat through the flue. It is thus the object of my invention to provide means for adapting an ordinary home furnace to a combustion of liquid fuels in an efficient manner; to provide such means in the shape of an accessory for the furnace whereby a suitable baffle is provided within the combustion chamber to increase the length of travel of the gases through the furnace before passing into the flue. It is a further object to provide a baffle and regenerator device that is comparatively simple and is constructed in a manner to resist the great heat to which it is subjected within the combustion chamber. Further and other advantages will be better apparent from a detailed description of the invention in connection with the accompanying drawing, in which:

Figure 1 is a vertical longitudinal section taken through a conventional type of hot air furnace showing my combined baffle and regenerator disposed within the combustion chamber thereof; Fig. 2 is a horizontal section through the furnace taken on a plane indicated by the line 2—2 of Fig. 1; Fig. 3 is an enlarged vertical section taken on the line 3—3 of Fig. 1 showing only a part of the combustion chamber and my improved device positioned therein; Fig. 4 is a cross-sectional detail taken through the flue showing my damper arrangement for controlling the effective passage therethrough; and Fig. 5 is a top plan of the baffle shelf which supports the bricks comprising the regenerator.

Referring to the drawing, F represents an ordinary hot air furnace and the combustion chamber C in which is disposed a conventional oil burner B. In the lower part of the furnace comprising the ash pit A, when the furnace utilizes solid fuel, I place a suitable standard S comprising a tripod 1 having a socket 2 and a supporting staff 3 disposed in said socket for the purpose of supporting the baffle shelf 6. The upper end of the shaft 3 terminates in a cylindrical portion 4 which is adapted to enter socket 5 formed at the middle of the semi-circular wall $w$ of shelf 6. The baffle shelf 6 has a downwardly depending baffle 7 at its forward edge and a plurality of spaced cross-bars 8 extending between its margins for the purpose of supporting the checker-work 9 constituting the regenerator. It is apparent that the checker-work 9 blocks off a large amount of the free space through the baffle shelf so that the flaming particles and hot gases rising from the burner B will be deflected on encountering said shelf and their path to the flue 10 will be more or less circuitous. Obviously, the checker-work 9 will become highly heated so that when the flame is cut off this check-work will give off its heat by radiation to the combustion chamber and prevent a sudden cooling of the furnace.

Obviously, the staff 3 and baffle shelf 6 must withstand considerable heat, for which reason these parts are preferably made of alloy steel containing chromium or nickel, or both, so that they may maintain a high tensile strength at high temperatures. Such alloys are well known in the art and are not claimed herein.

In order that the drafts through the flue 10 may be controlled a damper is provided comprising a sleeve 11 insertible within the flue and a thimble 12 insertible into said sleeve 11. The thimble opening 12' is controlled by a swinging damper 13 having a hinge element 14 carried by a hinge pin or bar 15 extended transversely of the thimble 12 near its outer edge thereof. The thimble 12 is provided with a notch $n$ to the rear of the hinge point of the damper 13 so that even though the damper 13 is closed products of combustion may escape into the flue through said notch. The damper 13 is suspended and is maintained in a closed position by its own weight so that when the pressure within the combustion chamber C is excessive the damper will be forced open to allow the accumulated products of combustion to rapidly escape through the flue 10. Under normal operation the damper 13 will remain closed, the products of combustion escaping through the notch $n$. The notch $n$ also allows for the escape of the products of combustion when the damper 13 is entirely opened so that practically the entire flue opening is available to relieve the accumulation of products of combustion when combustion within the chamber C is abnormally great.

Having described my invention, I claim:

In a furnace having a combustion chamber and a flue leading therefrom, a valve thimble mounted in the flue and extending into the combustion chamber, said thimble having a valve for controlling the escape of the products of combustion into the flue, said valve being adapted for operation by the pressure of the products of combustion within the combustion chamber, and said thimble having a by-pass for the products of combustion disposed between the valve and the flue.

JOHN WM. FRANZ.